(12) United States Patent
Genssle et al.

(10) Patent No.: US 8,806,854 B2
(45) Date of Patent: Aug. 19, 2014

(54) METHOD FOR MONITORING A CATALYTIC CONVERTER

(75) Inventors: Andreas Genssle, Musberg (DE); Torsten Handler, Stuttgart (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 13/440,810

(22) Filed: Apr. 5, 2012

(65) Prior Publication Data
US 2012/0255280 A1    Oct. 11, 2012

(30) Foreign Application Priority Data

Apr. 7, 2011    (DE) .......................... 10 2011 006 921

(51) Int. Cl.
| | | |
|---|---|---|
| *F01N 3/00* | (2006.01) | |
| *F01N 3/10* | (2006.01) | |
| *F01N 3/02* | (2006.01) | |
| *F01N 11/00* | (2006.01) | |
| *F01N 3/021* | (2006.01) | |
| *F01N 9/00* | (2006.01) | |
| *F02D 41/14* | (2006.01) | |
| *F02D 41/22* | (2006.01) | |
| *F01N 3/20* | (2006.01) | |

(52) U.S. Cl.
CPC ......... *F01N 11/00* (2013.01); *F01N 2900/1621* (2013.01); *F01N 3/021* (2013.01); *F01N 3/103* (2013.01); *F01N 3/2066* (2013.01); *F01N 9/002* (2013.01); *F01N 2550/02* (2013.01); *F01N 2560/05* (2013.01); *F01N 2900/0416* (2013.01); *F02D 41/1466* (2013.01); *F02D 41/222* (2013.01); *Y02T 10/40* (2013.01); *Y02T 10/47* (2013.01)

USPC .................. 60/276; 60/274; 60/277; 60/295; 60/299; 60/311

(58) Field of Classification Search
CPC ......... F01N 3/021; F01N 3/103; F01N 3/106; F01N 3/2066; F01N 11/00; F01N 2550/02; F01N 2560/05; F01N 2900/0416; F01N 2900/1621
USPC .................. 60/274, 276, 277, 295, 299, 311
See application file for complete search history.

(56) References Cited

U.S. PATENT DOCUMENTS

2011/0146246 A1*    6/2011    Farman et al. .................. 60/286

FOREIGN PATENT DOCUMENTS

| DE | 102007012701 | * | 9/2008 | ............. F01N 11/00 |
| DE | 102009024782 | * | 2/2010 | ............. F01N 11/00 |

* cited by examiner

*Primary Examiner* — Audrey K Bradley
(74) *Attorney, Agent, or Firm* — Michael Best & Friedrich LLP

(57) ABSTRACT

A method for monitoring the capability of a catalytic converter to convert nitrogen monoxide into nitrogen dioxide in the exhaust gas of an internal combustion engine, the catalytic converter being arranged in an exhaust gas duct of the internal combustion engine and the catalytic converter being followed downstream by a collecting particle sensor. It is in this case provided that, in a monitoring cycle, a decrease in the particle loading of the particle sensor during the operation of the internal combustion engine under predetermined operating conditions is taken to conclude an adequate capability of the catalytic converter to convert from nitrogen monoxide to nitrogen dioxide.

8 Claims, 2 Drawing Sheets

METHOD FOR MONITORING A CATALYTIC CONVERTER

BACKGROUND OF THE INVENTION

The invention relates to a method for monitoring the capability of a catalytic converter to convert nitrogen monoxide into nitrogen dioxide in the exhaust gas of an internal combustion engine, the catalytic converter being arranged in an exhaust gas duct of the internal combustion engine and the catalytic converter being followed downstream by a collecting particle sensor.

Legal regulations require that internal combustion engines undergo a monitoring of all emission-relevant components. For instance, exhaust treatment components and the associated sensor equipment have to be monitored as part of an "On-Board Diagnosis" (OBD) for compliance with limit values, which are usually specified as a multiple of the emission limit values. A partial aspect of this is the monitoring of the coating of a catalyst, in particular of a diesel oxidation catalyst, for adequate capability of oxidizing nitrogen monoxide into nitrogen dioxide, and consequently of providing a suitable reactant (feed gas) for an SCR catalyst (SCR=Selective Catalytic Reaction), which is downstream in the exhaust gas duct and in which nitrogen oxides are converted by means of urea into carbon dioxide, nitrogen and water.

According to the prior art, in the monitoring of components as part of the on-board diagnosis, it is generally necessary to restrict the operating parameters under which the monitoring can be carried out. To improve the distinction between a component that only just has to be rejected (best part unacceptable) and a component that can only just be accepted (worst part acceptable), the plausibility functions are then only carried out for a restricted range of one or more of the following variables: exhaust mass flow, exhaust volume flow, exhaust temperature, rotational speed, quantity of fuel injected, vehicle speed, ambient pressure, ambient temperature or exhaust gas recirculation rate. Restrictions may also be provided for the operating mode, status, running time or service life of the internal combustion engine or for ranges of the signals for nitrogen oxide, hydrocarbon, carbon monoxide, particle mass or oxygen concentration. Some monitoring methods also envisage only carrying these out under steady-state or virtually steady-state operating conditions of the internal combustion engine.

Particle filters are often used in combination with a diesel oxidation catalyst arranged upstream in the exhaust gas duct of internal combustion engines to reduce the particle emission of diesel engines. The exhaust gas is passed through the particle filter, which separates the solid particles that are in the exhaust gas and keeps them back in a filter substrate. Over time, the particle filter becomes clogged with the masses of particulate matter that are lodged in the filter substrate, which becomes noticeable by an increase in the flow resistance, and consequently in the pressure opposing the exhaust gas. For this reason, the lodged mass of particulate matter must from time to time be discharged in a regeneration process.

Collecting particle sensors, which are usually arranged downstream of the particle filter, are known for monitoring the function of the particle filter. Particulates from the exhaust gas are deposited on the surface of the collecting particle sensors. Depending on the particle loading, the particle sensor sends a corresponding output signal, which allows conclusions to be drawn about the amount of particles carried in the exhaust gas, and consequently about the retention capability of the particle filter.

In the case of one embodiment of collecting particle sensors, at least two interengaging interdigital electrodes are provided on a substrate. Particulates deposited on them increasingly short the two electrodes, which allows a flow of current between the electrodes. In a possible method of evaluation for such a particle sensor, the variation in current when a voltage is constantly applied between the interdigital electrodes is evaluated. For this purpose, the time between the beginning of a measuring cycle and the reaching of a flow of current referred to as the triggering threshold is measured. The time it takes until the triggering threshold is reached is a measure of the particle content in the exhaust gas. After the measuring cycle, the particle sensor is heated up in a regeneration process and the deposited particles are burned, so that a new measuring cycle can subsequently be started.

Even today there is still no known procedure that is technically possible on a mass-production scale for checking catalytic converters for their capability of setting a composition of the exhaust gas that is suitable for a following exhaust treatment step, in particular an $NO/NO_2$ ratio that is suitable for a selective catalytic reaction. It is therefore the object of the invention to provide a method that allows the monitoring of a catalytic coating for its capability of converting nitrogen monoxide into nitrogen dioxide.

SUMMARY OF THE INVENTION

The invention provides that, in a monitoring cycle, a decrease in the particle loading of the particle sensor during the operation of the internal combustion engine under predetermined operating conditions is taken to conclude an adequate capability of the catalytic converter to convert from nitrogen monoxide to nitrogen dioxide. Particles deposited on the particle sensor, generally particulate matter consisting predominantly of carbon, react with the nitrogen dioxide $NO_2$ carried in the exhaust gas in accordance with the following chemical reaction:

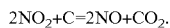

$$2NO_2 + C = 2NO + CO_2.$$

The deposited particulate matter is converted into carbon dioxide, whereby the amount of particles deposited on the particle sensor is reduced. A prerequisite for this reaction, also known as a CRT or $NO_2$ effect, is a minimum concentration of $NO_2$ in the exhaust gas of the internal combustion engine and a minimum exhaust gas temperature. This minimum concentration of $NO_2$ is only obtained if the catalytic coating of the catalyst upstream of the particle sensor has a sufficient capability for oxidizing nitrogen monoxide. If, accordingly, under suitable operating conditions of the internal combustion engine, predetermined for example by the quantity of fuel injected and the load, the particle loading of the particle sensor is reduced to a sufficient, predetermined extent, an intact capability of the catalytic converter to convert from nitrogen monoxide to nitrogen dioxide can be assumed. If, however, the particle loading reduces by an insufficient extent, remains the same or continues to increase, a defective upstream catalytic converter must be assumed. The change in the particle loading can in this case be determined simply from the output signal of the particle sensor. The operating conditions of the internal combustion engine during the monitoring cycle should be chosen such that, with a sufficient NO conversion capability of the catalytic converter, the reduction in the particle loading of the particle sensor caused by the reaction of the particles with $NO_2$ exceeds the deposition of new particles, which is the case for most operating conditions when the exhaust treatment system is intact. It should be pointed out that the actual monitoring of the diesel particle filter (DPF) by means of the particle sensor is not impaired by the procedure described here, since the CRT or $NO_2$ effect can be correspondingly taken into consideration during the monitoring.

For monitoring, for example, the filter action of a particle filter in the exhaust gas duct of a diesel engine, it is usual today to use collecting particle sensors, which evaluate the flow of current between two interengaging interdigital electrodes provided on a substrate by the particles deposited on them. In order to monitor the capability of an upstream catalytic converter to convert from nitrogen monoxide to nitrogen dioxide, it may therefore be provided that the flow of current between two interdigital electrodes of the particle sensor is determined and that an adequate capability of the catalytic converter to convert from nitrogen monoxide to nitrogen dioxide is concluded if the flow of current between the interdigital electrodes decreases during the operation of the internal combustion engine.

An essential prerequisite for carrying out the method is that a sufficient amount of particles that can react with the nitrogen dioxide of the exhaust gas has been deposited on the particle sensor. In order to ensure this, it may be provided that, before the monitoring cycle or at the beginning of the monitoring cycle, an adequate amount of particles for an evaluation of the output signal of the particle filter is deposited on the particle sensor. The amount of deposited particles must in this case be great enough to obtain an evaluable measuring signal of the particle sensor of a level that can also demonstrate a decrease in the particle loading on the sensor element. For a collecting particle sensor, which measures the flow of current between two interdigital electrodes, this may mean, for example, that the amount of particles is increased beyond the amount of particles required for reaching the triggering threshold.

An adequate amount of particles can be deposited on the particle sensor by a monitoring cycle being performed directly after a regeneration phase of a particle filter arranged upstream of the particle sensor. Directly after the regeneration, in which particles deposited in the particle filter are burned, the permeability of the particle filter is increased for a short time. With sufficiently sensitive particle sensors, it is thus possible to load the particle sensor in a measurable manner.

A further possible way of depositing an adequate amount of particles on the particle sensor is that a regeneration of the particle sensor is delayed until an adequate amount of particles for carrying out a monitoring cycle has been deposited on the particle sensor. In the regeneration, the particles adhering to the particle sensor are burned, in order to condition the particle sensor for a new measuring cycle for determining the particle content in the exhaust gas in accordance with its original task. To carry out a monitoring cycle for monitoring the NO conversion capability of an upstream catalytic converter, the regeneration of the particle sensor may be deferred to such a time that there is an adequate amount of particles for demonstrating the reduction of particles by nitrogen dioxide. For a collecting particle sensor, which measures the flow of current over two interdigital electrodes, this may mean, for example, that, after reaching the triggering threshold, no regeneration of the particle sensor is performed but the loading is continued further, until there is an adequate amount of particles on the particle sensor.

With an intact exhaust treatment system, only few particles reach the particle sensor. In order nevertheless to provide an adequate amount of particles for carrying out the monitoring cycle, it may be provided that a particle sensor with a layer catalytically producing particulate matter from long-chain hydrocarbons is used and that, before a monitoring cycle or at the beginning of a monitoring cycle, long-chain hydrocarbons are fed to the particle sensor. The layer catalytically producing particulate matter may be produced, for example, from a zeolite.

The method can be used for monitoring catalytic layers in the exhaust system of an internal combustion engine, preferably for monitoring the capability of a catalytic coating of a diesel oxidation catalyst, a diesel particle filter, an SCR catalyst or other components bearing catalytic layers of the exhaust gas duct to convert nitrogen monoxide into nitrogen dioxide. SCR catalysts (SCR=Selective Catalytic Reduction) serve thereby for the selective reduction of nitrogen oxides.

The method can also be used for monitoring the function of the particle sensor. Thus, for example, in the case of a collecting particle sensor with interdigital electrodes, the measuring capability and the function of the interdigital electrode can be demonstrated by the decrease in the current signal under certain operating conditions of the internal combustion engine.

BRIEF DESCRIPTION OF THE DRAWING

The invention is explained in more detail below on the basis of an exemplary embodiment that is represented in the figures, in which.

DETAILED DESCRIPTION

Figure 1:
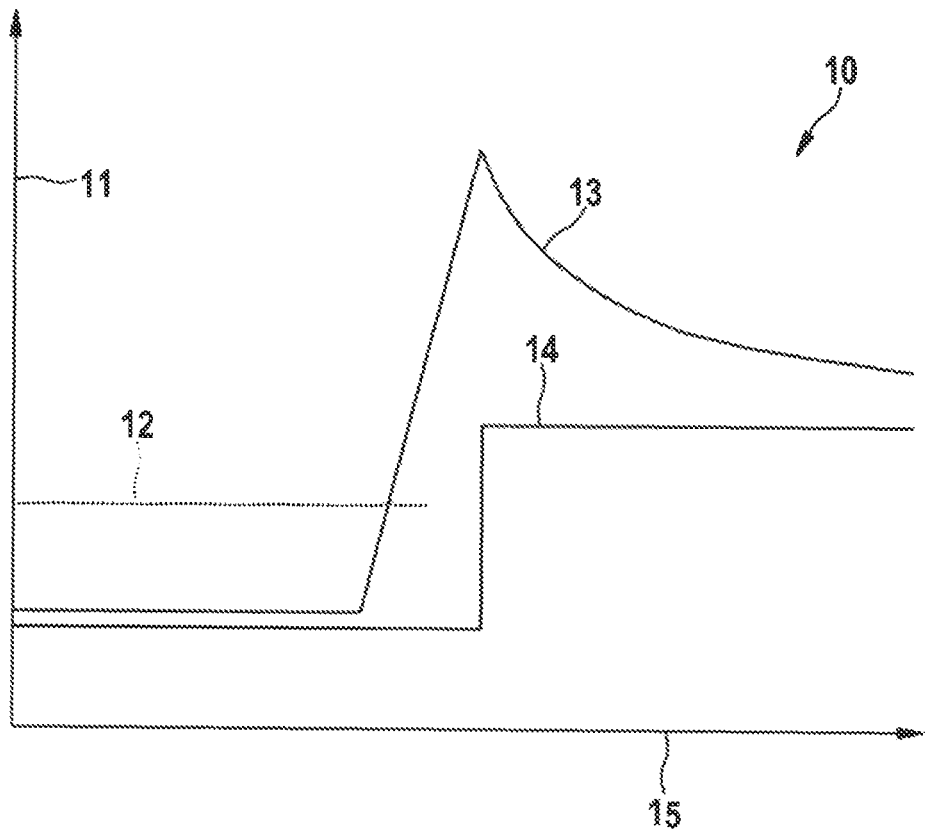
FIG. 1 shows a variation over time of an output signal of a collecting particle sensor in the exhaust gas duct of an internal combustion engine.
Figure 2:
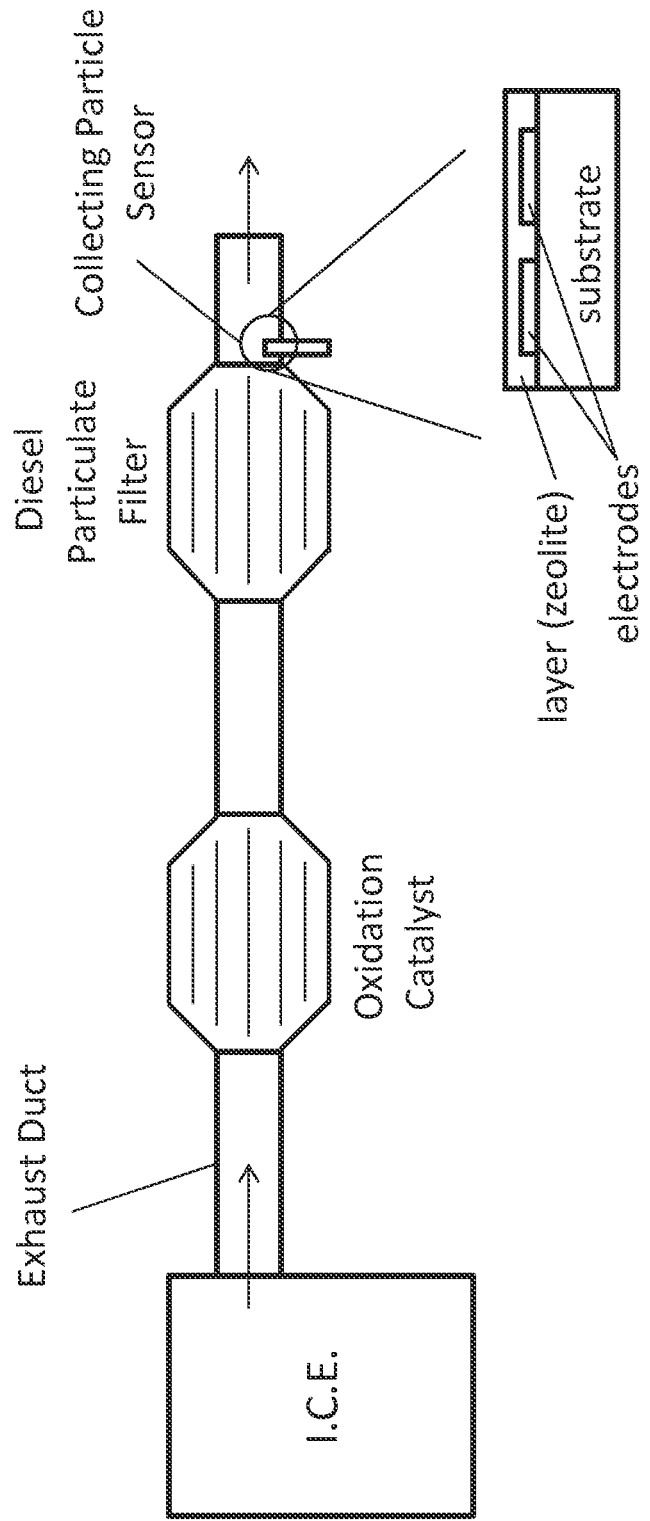
FIG. 2 schematically illustrates the exhaust gas duct of the internal combustion engine, including the collecting particle sensor.

FIG. 1 shows the variation over time of an output signal 13 of a collecting particle sensor in the exhaust gas duct of an internal combustion engine, plotted along a time axis 15 and a signal axis 11 in a time diagram 10. The variation over time of an amount of nitrogen dioxide 14 in the exhaust gas at the position of the particle sensor is also entered in the time diagram 10.

In the exemplary embodiment shown, the output signal 13 corresponds to the flow of current between two interengaging interdigital electrodes of a sensor element of the particle sensor with a constantly applied voltage, the electrodes being arranged on a nonconducting substrate. From the exhaust gas, particulates are deposited on the sensor element and increasingly short the interdigital electrodes. During this first phase, when particulates are collecting, the output signal 13 indicates a constant value as long as no bridges of particulate matter have formed between the interdigital electrodes. As soon as bridges of particulate matter form, the output signal 13 increases and exceeds a triggering threshold 12.

In the known application of the particle sensor for determining the particle content in the exhaust gas of the internal combustion engine, the time period between the beginning of a measuring phase and the reaching of the triggering threshold 12 is used as a measure of the particle content of the exhaust gas. In this case, after reaching the triggering threshold 12, the particle sensor is cleaned by burning it free and a new measuring phase can begin.

For the functional monitoring according to the invention of a catalytic coating of an oxidation catalyst arranged upstream of the particle sensor to convert nitrogen monoxide into nitrogen dioxide, the collecting phase is extended and the output signal 13 of the particle sensor continues to increase. If the amount of nitrogen dioxide in the exhaust gas is then increased by the nitrogen monoxide being converted into nitrogen dioxide in the oxidation catalyst arranged upstream of the particle filter, particulate matter and nitrogen dioxide on the surface of the particle sensor are converted into nitrogen monoxide and carbon dioxide. The conversion thereby takes place according to the following chemical reaction equation:

$$2NO_2 + C \rightarrow 2NO + CO_2.$$

The decreasing amount of particulate matter on the surface of the particle sensor leads to a decrease in the output signal 13 of the particle sensor, which indicates an intact catalytic coating of the oxidation catalyst.

If there is an inadequate conversion capability of the oxidation catalyst for the conversion of nitrogen monoxide into nitrogen dioxide, the output signal 13 of the particle sensor would remain constant or continue to increase, and thus indicate the malfunction.

The invention claimed is:

1. A method for monitoring the capability of a catalytic layer to convert nitrogen monoxide into nitrogen dioxide in the exhaust gas of an internal combustion engine, the catalytic layer being arranged in an exhaust gas duct of the internal combustion engine and the catalytic layer being followed downstream by a collecting particle sensor, the method comprising:
   providing particles to the particle sensor to carry out a monitoring cycle,
   in the monitoring cycle, the particle sensor is used to determine a decrease in a particle loading during the operation of the internal combustion engine under predetermined operating conditions which is taken to conclude an adequate capability of the catalytic layer to convert nitrogen monoxide to nitrogen dioxide, and
   before the monitoring cycle or at the beginning of the monitoring cycle, an adequate amount of particles for an evaluation of an output signal of the particle sensor is deposited on the particle sensor.

2. A method for monitoring the capability of a catalytic layer to convert nitrogen monoxide into nitrogen dioxide in the exhaust gas of an internal combustion engine, the catalytic layer being arranged in an exhaust gas duct of the internal combustion engine and the catalytic layer being followed downstream by a collecting particle sensor, the method comprising:
   providing particles to the particle sensor to carry out a monitoring cycle,
   in the monitoring cycle, the particle sensor is used to determine a decrease in a particle loading during the operation of the internal combustion engine under predetermined operating conditions which is taken to conclude an adequate capability of the catalytic layer to convert nitrogen monoxide to nitrogen dioxide, and
   a regeneration of the particle sensor is delayed until an adequate amount of particles for carrying out the monitoring cycle has been deposited on the particle sensor.

3. A method for monitoring the capability of a catalytic layer to convert nitrogen monoxide into nitrogen dioxide in the exhaust gas of an internal combustion engine, the catalytic layer being arranged in an exhaust gas duct of the internal combustion engine and the catalytic layer being followed downstream by a collecting particle sensor, the method comprising:
   providing particles to the particle sensor to carry out a monitoring cycle, in the monitoring cycle, the particle sensor is used to determine a decrease in a particle loading during the operation of the internal combustion engine under predetermined operating conditions which is taken to conclude an adequate capability of the catalytic layer to convert nitrogen monoxide to nitrogen dioxide,
   determining a flow of current between two interdigital electrodes of the particle sensor, and
   concluding an adequate capability of the catalytic layer to convert nitrogen monoxide to nitrogen dioxide if the flow of current between the interdigital electrodes decreases during the operation of the internal combustion engine.

4. The method of claim 3, wherein the catalytic layer is provided in a diesel oxidation catalyst.

5. The method of claim 3, wherein the catalytic layer is provided in a diesel particle filter.

6. The method according to claim 3, wherein the monitoring cycle is performed directly after a regeneration phase of a particle filter arranged upstream of the particle sensor.

7. The method according to claim 3, wherein the particle sensor includes a layer catalytically producing particulate matter from long-chain hydrocarbons and before the monitoring cycle or at the beginning of the monitoring cycle, long-chain hydrocarbons are fed to the particle sensor.

8. The method of claim 3, further comprising concluding an adequate measuring capability of the particle sensor in response to the decrease in current flow between the two interdigital electrodes.

* * * * *